(12) United States Patent
Journade et al.

(10) Patent No.: US 8,640,987 B2
(45) Date of Patent: Feb. 4, 2014

(54) AIRCRAFT ENGINE MOUNTING STRUCTURE, ASSEMBLY COMPRISING THIS STRUCTURE AND ASSOCIATED AIRCRAFT

(75) Inventors: Frederic Journade, Toulouse (FR); Laurent Lafont, Pechbusque (FR); Laurent Agostini, La Salvetat Saint Gilles (FR); Eric Renaud, Brignemont (FR); Delphine Jalbert, Seilh (FR)

(73) Assignee: Airbus Operations S.A.S., Toulouse (FR)

( * ) Notice: Subject to any disclaimer, the term of this patent is extended or adjusted under 35 U.S.C. 154(b) by 143 days.

(21) Appl. No.: 13/496,102

(22) PCT Filed: Sep. 20, 2010

(86) PCT No.: PCT/FR2010/051949
§ 371 (c)(1),
(2), (4) Date: Mar. 14, 2012

(87) PCT Pub. No.: WO2011/036385
PCT Pub. Date: Mar. 31, 2011

(65) Prior Publication Data
US 2012/0175462 A1    Jul. 12, 2012

(30) Foreign Application Priority Data
Sep. 22, 2009 (FR) .................................. 09 56528

(51) Int. Cl.
*B64D 27/00* (2006.01)
(52) U.S. Cl.
USPC ............................... 244/54; 248/554; 60/297

(58) Field of Classification Search
USPC .................... 244/54; 248/554, 555, 556, 557; 60/797, 796
See application file for complete search history.

(56) References Cited

U.S. PATENT DOCUMENTS

| 5,746,391 | A  | * | 5/1998  | Rodgers et al. | ................. 244/54 |
| 7,350,747 | B2 | * | 4/2008  | Machado et al. | ............... 244/54 |
| 7,451,947 | B2 | * | 11/2008 | Machado et al. | ............... 244/54 |
| 7,677,493 | B2 | * | 3/2010  | Diochon et al. | ................ 244/54 |
| 7,740,200 | B2 | * | 6/2010  | Diochon et al. | ................ 244/54 |

(Continued)

FOREIGN PATENT DOCUMENTS

| EP | 1 902 951 A1 | 3/2008 |
| FR | 2 873 987 A1 | 2/2006 |

(Continued)

OTHER PUBLICATIONS

U.S. Appl. No. 13/496,033, filed Mar. 14, 2012, Journade, et al.

(Continued)

*Primary Examiner* — Christopher P Ellis
(74) *Attorney, Agent, or Firm* — Oblon, Spivak, McClelland, Maier & Neustadt, L.L.P.

(57) ABSTRACT

An engine is suspended from a main linear portion of a structure mounted on a fuselage or a wing surface of an aircraft. A connection includes flat symmetrical wings at an angle to one another, to support an attaching flange on which the engine is mounted, directly or through a mounting element. The flat shape of the wings makes them easy to manufacture, and enables them to resist the forces satisfactorily. The intermediate element resists overhang forces of the mounting satisfactorily. Flexible connections filter the engine's vibrations and prevent irregular forces being transmitted.

15 Claims, 5 Drawing Sheets

(56) References Cited

U.S. PATENT DOCUMENTS

| | | | |
|---|---|---|---|
| 7,784,733 B2* | 8/2010 | Diochon et al. | 244/54 |
| 8,038,092 B2* | 10/2011 | Diochon et al. | 244/54 |
| 8,042,342 B2* | 10/2011 | Diochon et al. | 60/797 |
| 8,118,251 B2* | 2/2012 | Suciu et al. | 244/54 |
| 8,118,252 B2* | 2/2012 | Dumont et al. | 244/54 |
| 8,162,254 B2* | 4/2012 | Roche | 244/54 |
| 2003/0201366 A1* | 10/2003 | Connelly et al. | 244/121 |
| 2008/0042008 A1 | 2/2008 | Diochon et al. | |
| 2008/0067287 A1 | 3/2008 | Guibert et al. | |
| 2009/0183512 A1* | 7/2009 | Suciu et al. | 60/797 |
| 2009/0255271 A1 | 10/2009 | Vauchel et al. | |
| 2011/0290934 A1* | 12/2011 | Journade et al. | 244/54 |
| 2012/0111995 A1* | 5/2012 | Lafont | 244/54 |

FOREIGN PATENT DOCUMENTS

| | | |
|---|---|---|
| FR | 2 900 907 A1 | 11/2007 |
| FR | 2 907 098 A1 | 4/2008 |
| FR | 2 913 664 A1 | 9/2008 |
| FR | 2 928 347 A1 | 9/2009 |
| WO | WO 2008/000924 A1 | 1/2008 |

OTHER PUBLICATIONS

International Search Report issued Nov. 18, 2010 in PCT/FR2010/051949.

International Search Report issued Nov. 18, 2010 in PCT/FR2010/051950.

* cited by examiner

AIRCRAFT ENGINE MOUNTING STRUCTURE, ASSEMBLY COMPRISING THIS STRUCTURE AND ASSOCIATED AIRCRAFT

The subject of the invention is firstly an aircraft engine mounting structure, together with an aircraft assembly including its structure and an associated aircraft.

There are many types of aircraft engine mounting structures for mounting on a fuselage or wing surface; most include, after a linear main portion of the structure, a connecting portion to which the engine is attached, which has the shape essentially of a half-barrel. This design has several disadvantages, and above all complexity of manufacture of the structure, due to the complicated shape of the connecting portion and to its junction with the main portion, together with poor transmission of the thrust originating from the engine, which produces substantial bending moments in the connecting portion, and vibrations.

French patents 2 873 088 and 2 900 907 illustrate known designs of mounting structures.

The first aim of the invention is therefore to propose an aircraft engine mounting structure with a simplified shape, with as few irregularities as possible, capable of receiving all the motive forces in a single plane which is approximately perpendicular to the engine's axis, and which, in certain particular embodiments, enables the vibrations originating from the engine to be filtered efficiently, and the aircraft's comfort to be improved.

A general form of the invention is an aircraft engine mounting structure, including a linear main portion and a connecting portion attached to the main portion, characterised in that the connecting portion includes two flat wings extending laterally to the main portion at an angle to one another, and an attaching flange able to transmit all the motive forces, where the attaching flange extends at least over a sector of a circle and is attached to the wings by a flat face.

Both wings of the connecting portion provide a shape transition between the end of the linear main portion and the circular flange by which the engine is attached, which is designed to transmit the forces satisfactorily and to be able to be manufactured simply.

The wings can consist of panels which may be stiffened, or discontinuous structures such as interconnected connecting rods. When panels are used an interesting embodiment consists in connecting them together by a central panel forming a single part with them, which is combined with an end face of the structure's main portion: it is then convenient to stiffen the assembly consisting of the central panel and the wings by ribs. If the wings consist of connecting rods, there can be three such for each wing, connected to one another in the shape of a triangle.

Several designs are conceivable for the attaching flange. It can, notably, extend over a full circle, or only over a sector of a circle; it is of interest for it to be then reinforced by an additional sector attached to it so as to close the circle, and built with a section which is less resistant than the main portion of this flange. An interesting design of the wings is obtained when they are manufactured such that they are shorter the further they are from the attaching flange, enabling the engine to be better exposed.

A possible disadvantage of this design is the existence of an overhang between the main portion of the structure and the engine's attaching flange. It is, however, possible to avoid it if the wings' width is equal to the width of the structure's main axial portion, the flange being then adjacent to the structure.

The attaching flange can be attached directly to the engine; but according to a different design which may be more advantageous, although it is complex, the engine is attached to the attaching flange by a mounting element which includes a first flange attached to the attaching flange and a second flange attached to the engine, where the flanges are circular, where the mounting element also includes a rigid structure attaching the first flange to the second flange, and where the first flange, the second flange and the rigid structure surround the engine.

This second design may be useful in particular when it is sought to mount the engine by the region of its centre of gravity, in order to limit the internal deflection, the stresses and the vibrations which it transmits, as shall be described in greater detail below. It is also suited to the construction of wings without any overhang protruding from the structure in the axial direction.

Filtration of the thrust and of the vibrations is improved if the mounting element is attached by flexible connections at least to the engine (and, possibly, also to the structure). In order to support the bearing surface of the engine overhanging relative to the attaching flange, the assembly may be completed by an additional flexible connection between the engine and the structure, where the additional flexible connection and the mounting element are positioned either side of the attaching flange in an axial direction of the aircraft.

The invention also concerns an aircraft fitted with a mounting structure or with an aircraft assembly according to the foregoing.

The invention will now be described in detail by means of the following figures.

Figure 12:
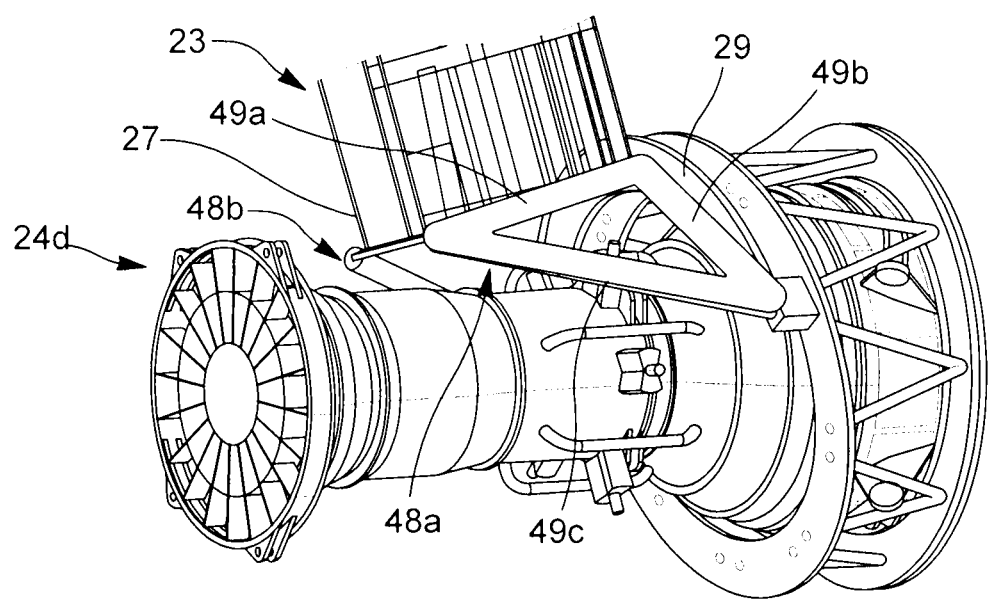

and FIG. 12 illustrates a fourth embodiment of the invention.

Figure 1:
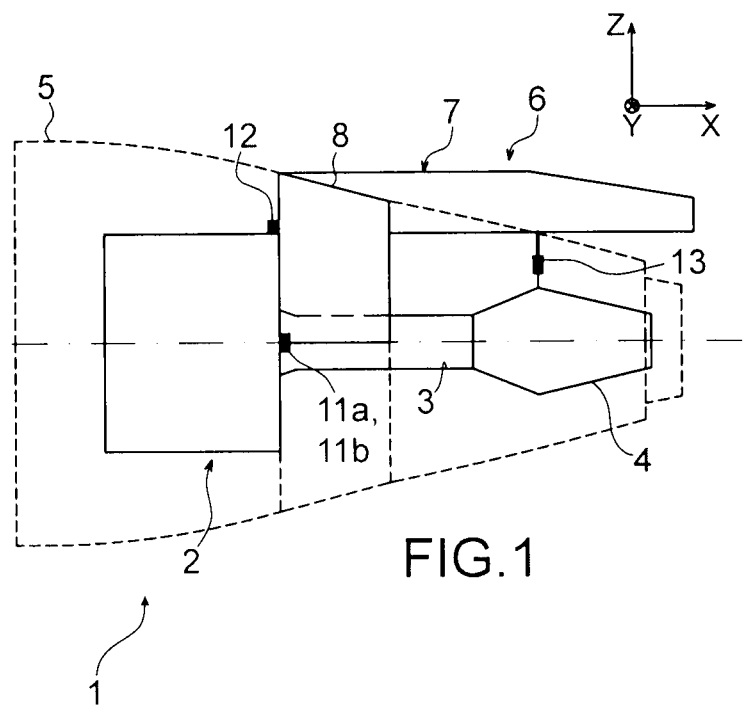
FIGS. 1 and 2 illustrate a first prior embodiment of a mounting structure.
Figure 2:
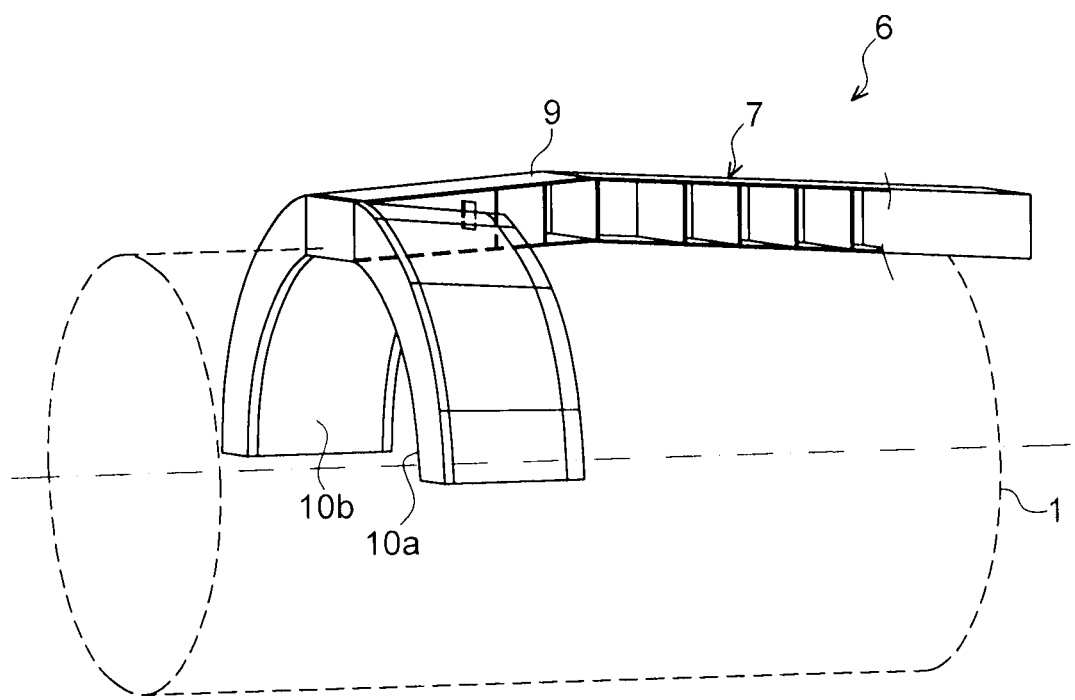

One end of a mounting structure in accordance with the previous indications is the subject of French patent 2 900 907, the description of which is illustrated briefly in FIGS. 1 and 2. Engine 1 firstly includes at the rear a fan element 2, a high-pressure element 3 ("core") and a front-to-rear ejection element 4 in a nacelle 5. Structure 6 includes a rigid main portion 7 extending lengthways above high-pressure portion 3 and ejection portion 4, and a mounting portion 8. FIG. 2 shows that main portion 7 has a stiffened structure consisting of boxes and that mounting portion 8 includes a central stringer 9, extending over the upper cone distance of engine 1 (at twelve o'clock), which extends main portion 7; mounting portion 8 is itself extended by semicircular wings, 10a and 10b, each of which covers a quarter circle, and which also have a stiffened structure consisting of boxes. FIG. 1 also represents the connections of the engine to the structure, 11a and 11b, extending to the base of wings 10a and 10b respectively, 12 extending in front of stringer 9 and 13 extending between main portion 7 and the middle of ejection portion 4, which is markedly to the rear of the previous ones, which are positioned in a junction plane between fan portion 2 and high-pressure portion 3.

This design therefore has the disadvantages that it is difficult to design and manufacture mentioned above, due to the variations of direction between horizontal main portion 7, inclined stringer 9 and uninclined wings 10a and 10b and risks of poor transmission of the thrust to structure 6 due to the circular shape of wings 10a and 10b and to the axially short junction between main portion 7 and the wings.

Figure 3:
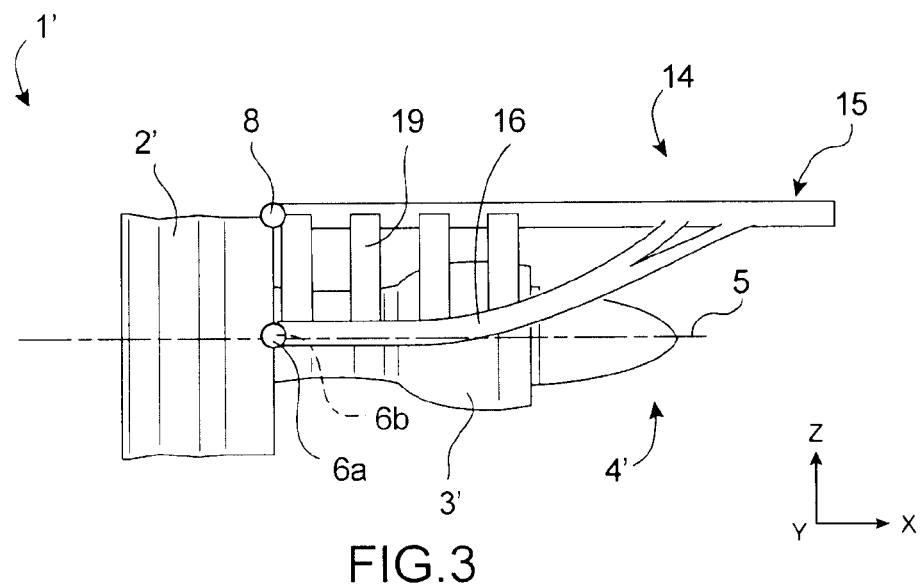
FIGS. 3 and 4 illustrate a second prior embodiment of a mounting structure.
Figure 4:
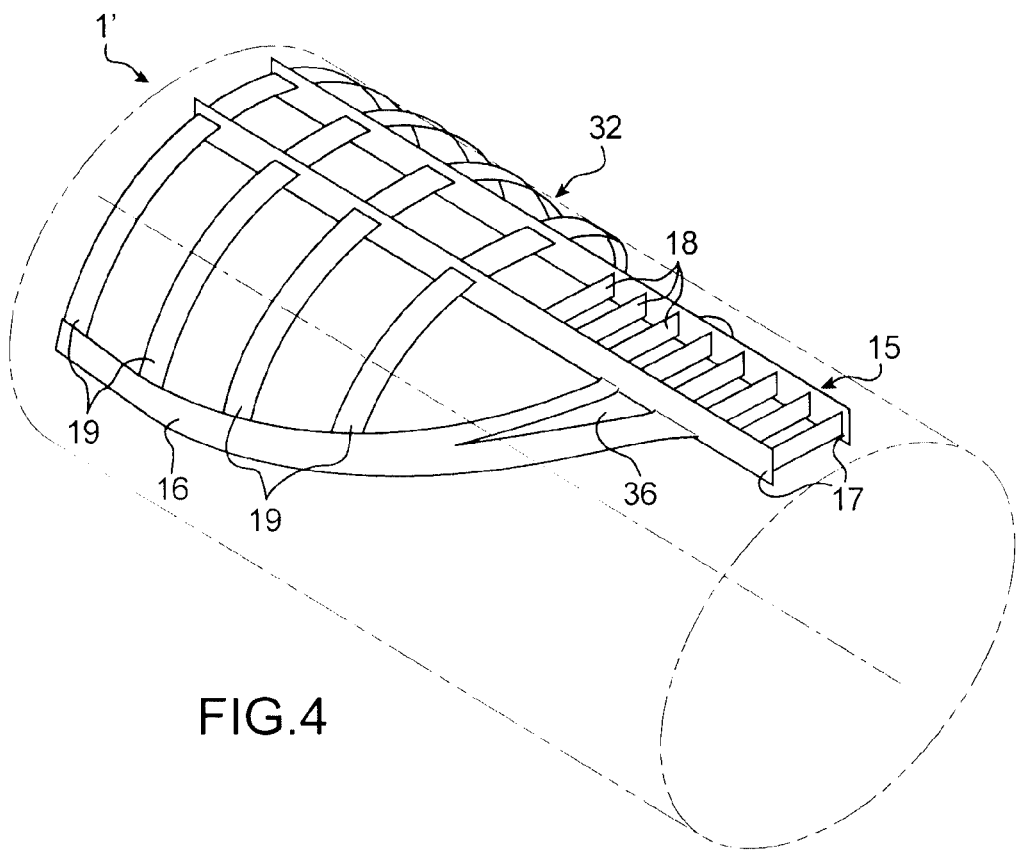
Figure 5:
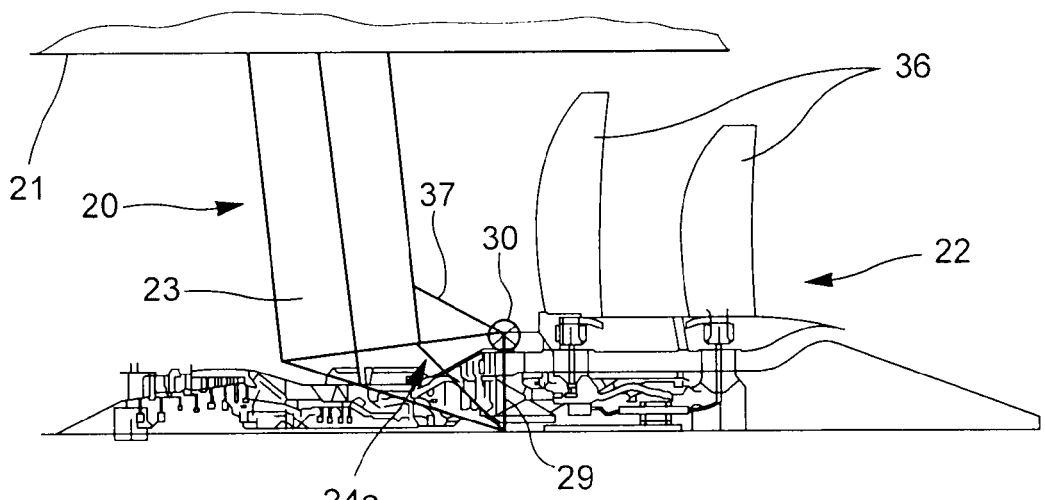
FIGS. 5 to 8 illustrate a first embodiment of the invention.
Figure 6:
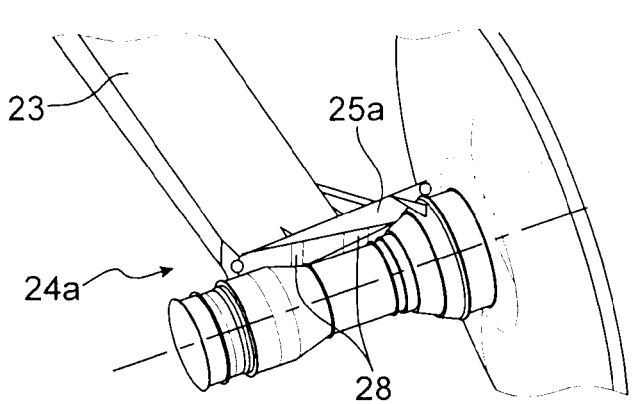
Figure 7:
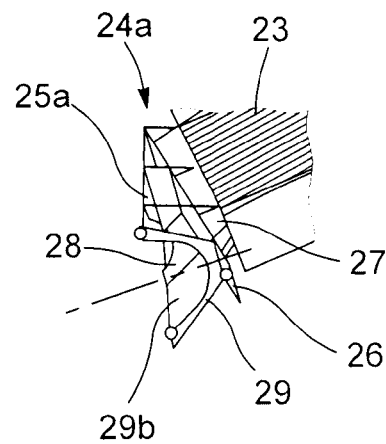
Figure 8:
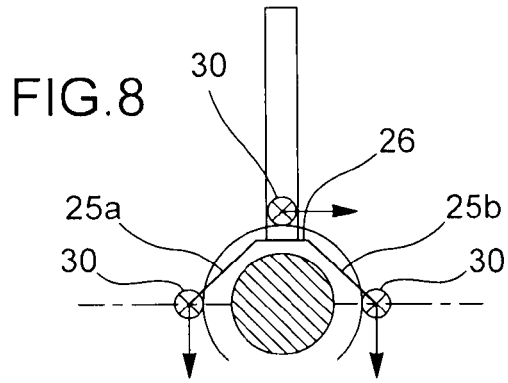

The design of French patent 2 873 988 will also be mentioned, represented in FIGS. 3 and 4, where an engine 1', comparable to the previous one in that it consists of a fan portion 2', a high-pressure portion 3' and an ejection portion 4', is supported by a structure 14 including a rigid structure 15 aligned with the aircraft axis, and from which symmetrical ribs 16 extend (a single one is shown in the figures), which moves lower along the length of engine 1' as far as its median horizontal plane as it extends forwards. Rigid structure 14 consists of two parallel stringers 17 ribbed by transverse intermediate braces 18 which connect them. Hoops 19 connect ribs 16 to stringers 17, and stringers 17 to one another forward of struts 18. Here again the overhang of structure 14 is substantial and the large number of curved parts make manufacture difficult.

A first embodiment of a new mounting structure is described by means of FIGS. 5, 6, 7 and 8. The structure is given general reference 20 and connects an aircraft 21 (partially represented) to an engine, now 22. It includes a linear and roughly vertical main portion 23, which can have a boxed-based structure as in many known embodiments, and a portion 24a which connects to engine 22. Connecting portion 24a includes two symmetrical wings 25a and 25b, which are at an acute or obtuse angle to one another, extending either side of main portion 23 in a lateral direction, and beneath it, covering a central portion of engine 22. Wings 25a and 25b are flat panels, connected to one another by a central panel 26 with which they form a single part, and which is combined with an end face 27 of main portion 23, and they are made rigid by ribs 28 located under main portion 23, which connect them to one another and also to central panel 26.

Connecting portion 24a also includes an attaching flange 29, which may be flat or box-shaped, extending over a sector of a circle; it is combined with wings 25a, 25b and with central panel 26 by a flat face, and supports connections 30 to engine 22. One of connections 30 is at twelve o'clock (to the upper cone distance of engine 22); the others are at the height of the horizontal median plane or higher (forming an angle of 180° or less, the top of which is in the axis of rotation of engine 22) on its face. This embodiment is characterised by very great simplicity of design, which means in particular in that all the parts are flat and defined by rectilinear edges, which it is therefore easy to assemble, with the inevitable exception of attaching flange 29, which it is nonetheless possible to attach by a flat face to the ends of wings 25a, 25b and of central panel 26. The appearance of complex stresses is also limited in connecting portion 24a, notably bending stresses around the vertical axis Z and transverse axis Y, which are difficult to prevent in previous designs of more complicated shape: the thrust of engine 22 is transmitted to wings 25a, 25b and to central panel 26 in the form of forces directed in their plane, theoretically without a perpendicular component with regard to which the connecting part would be much less rigid.

Connections 30 can be positioned in the same transverse plane of engine 22, advantageously close to its centre of gravity, and can consist of flexible connections. The resulting effects will be described in greater detail in connection with another embodiment. It should be noted that, generally, the embodiments described in this text are neither exclusive nor incompatible, but that their details can, on the contrary, often be combined or transposed by determining the forces associated with these details.

Figure 9:
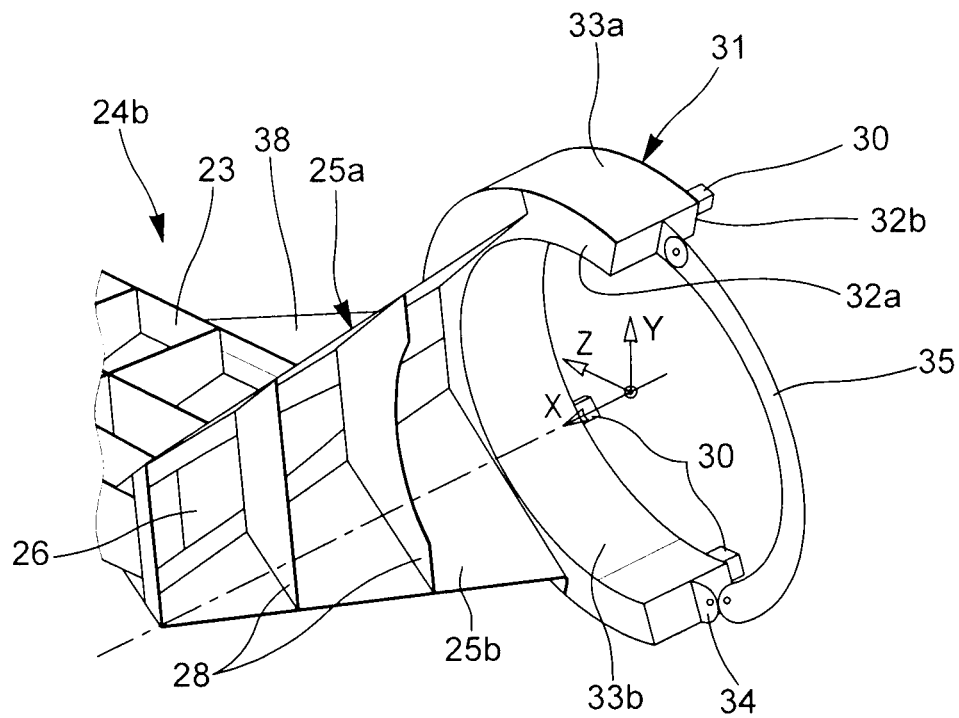
FIG. 9 illustrates a second embodiment of the invention.

FIG. 9 represents another embodiment, in which the attaching flange now has reference 31 and is distinguished from the previous one in that it extends over a certain width (measured in the axial direction of engine 22 and of aircraft 21), that it has a structure partitioned into boxes with two flat skins 32a and 32b attached respectively to wings 25a and 25b and to central panel 26, and to engine 22 by connections 30, two concentric circular skins 33a and 33b joining the preceding ones, and an internal stiffening skin 34, which extends between circular skins 33a and 33b halfway between flat skins 32a and 32b. A perhaps more remarkable element of this embodiment is a stiffening hoop 35 which connects the ends of attaching flange 31, where it is connected to one of them and secures the other by passing under engine 22; its role is not to support engine 22 but to improve the cohesion of the connecting portion (24b in this embodiment); it is recommended that attaching flange 31 then extends over slightly more than a half-circle, and hoop 35 over slightly less.

A disadvantage common to both these embodiments nonetheless appears when main portion 23 of structure 20 must be at some distance from the region of attachment to engine 22 in the axial direction, for example to position it at some distance from propellers 36, which then means that connecting portion 24a or 24b must be lengthened, and a substantial overhang must be left between main portion 23 of structure 20 and connections 30 to engine 22. The forces due to these overhangs can be partly absorbed by stay beams 37 (represented in FIG. 5) connecting attaching flange 29 to main portion 23 or, in an equivalent manner, full ribs 38 extending at the same locations. A more radical design to reduce the overhang effects, by eliminating this overhang from connecting portion 24, will be described by means of other embodiments of the mounting structure, described in detail below.

Figure 10:
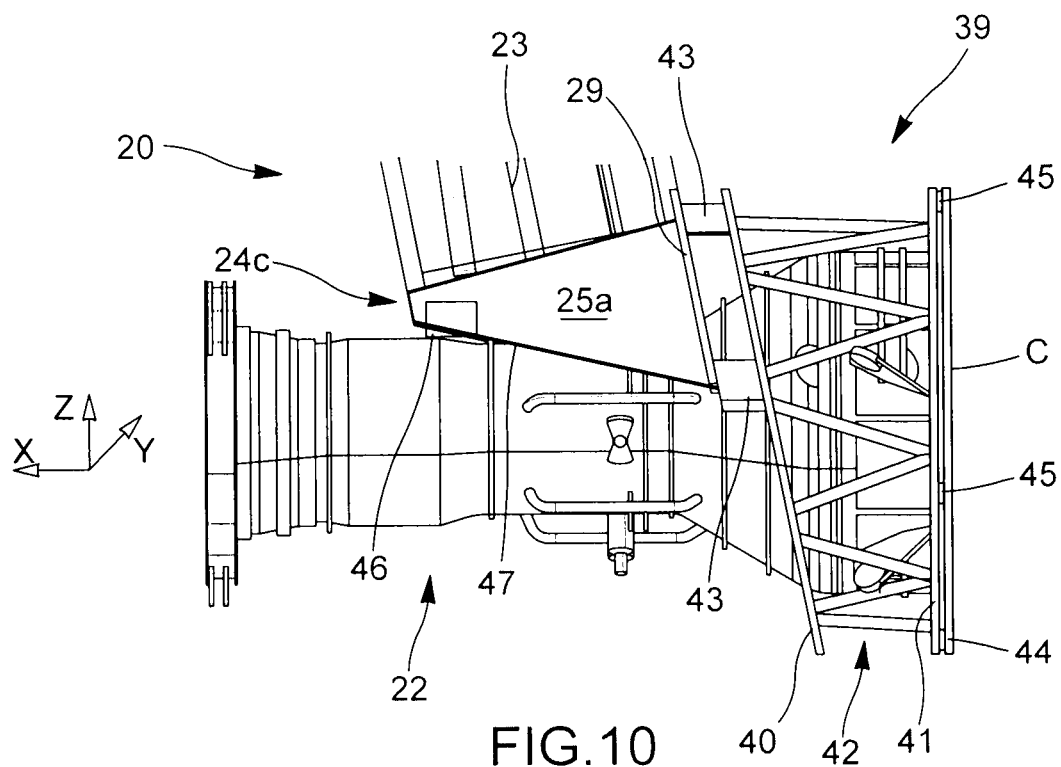
FIGS. 10 and 11 illustrate a third embodiment of the invention.
Figure 11:
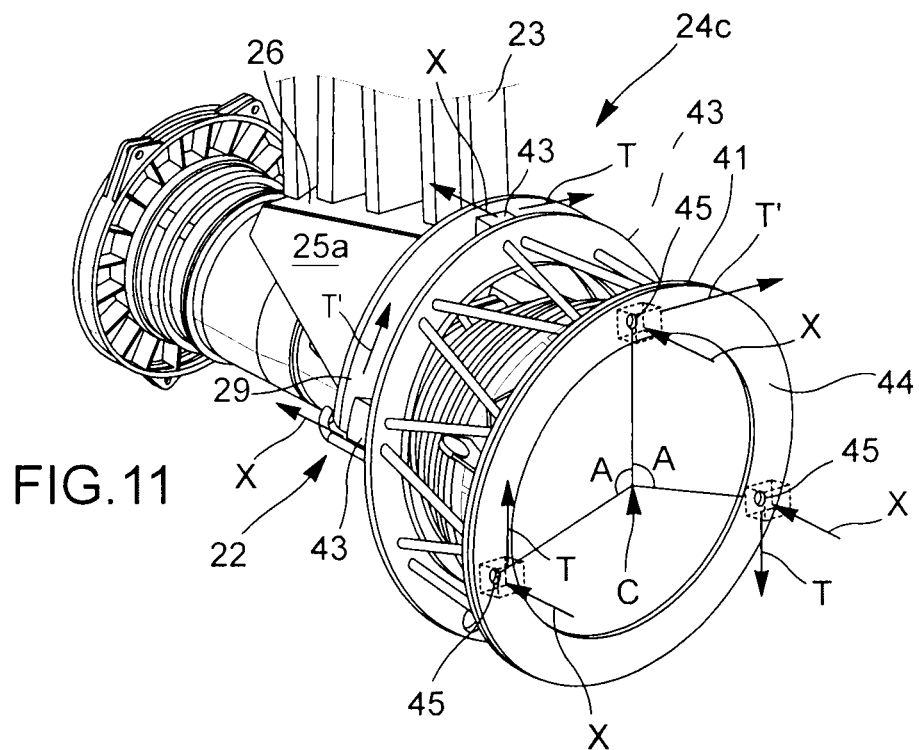

Reference will be made to FIGS. 10 and 11. Connecting portion 24c includes as above wings 25a, 25b and central panel 26, but in this case they are less wide, i.e. they do not extend beyond main portion 23 in axial direction X of the aircraft. Attaching flange 29 in this case is not attached directly to engine 22, but to a mounting element 39 consisting of a first flange 40, a second flange 41 and a rigid structure 42 which is intermediate to flanges 40 and 41. First flange 40 is connected to attaching flange 29 by bolts or by flexible connections 43; and second flange 41 is connected to a flange 44 of engine 22, by bolts or flexible connections 45. Second flange 41 and flexible connections 45 surround a region of the centre of gravity C of engine 22 (represented in truncated fashion in these figures). Rigid structure 42 can consist of panels or, perhaps more advantageously, discontinuous elements over the circumference, such as frames, beams or tubes, which have been represented. It should be noted that flanges 40 and 41 have no required alignments and are not necessarily parallel with one another: it is plausible for second flange 41 supporting connections 45 to engine 22 to be in a plane which intersects at right angles the axis of engine 22, and for first flange 40 to be oblique, parallel to attaching flange 29 extending the rear face of main portion 23 of structure 20, where this main portion 23 can be inclined; but this is not essential.

Mounting element 39 intermediate to connecting portion 24c and to engine 22 has greater resistance than this portion, and therefore resists the forces produced by the overhang better than it. Another advantage is that it forms a circular structure which completely encloses engine 22 and therefore resists what are called disc ruptures, i.e. damage to the rotor of engine 22 in which a portion extending over an angular sector is detached and is projected under the action of centrifugal forces outside the engine, puncturing its case and destroying the surrounding structures. These disc ruptures, which can occur in a variety of locations, have catastrophic consequences if they break the structure and if the engine falls; but this eventuality should be ruled out in this case, since mounting element 39 extends over a complete circumference of engine 22, and should therefore remain largely intact, even if the rupture projectile passes through it; and, in addition, structure 20 and attaching flange 29 have sufficient extensions in the direction of the engine's axis, and in an angular direction for them not to be cut completely by a rupture in their direction.

Reference will be made more particularly to FIG. 11 for the description of a particular attachment method. Judiciously chosen connections allow isostatic assemblies, which enable the distribution of the stresses to be controlled, and by this means the most unfavourable stresses to be prevented in the elements which they connect, namely the bending stresses in connecting portion 24c and also in engine 22, since the deflections lead to irregularities of play between the rotor and the stator, to reductions of performance, and possibly to premature wear and tear. An assembly of interest includes three connections 45 between second flange 41 and flange 44 of the engine, regularly distributed over the circumference, with one positioned in the upper cone distance, and where each is designed to be able to transmit a force in axial direction X and another force in tangential direction T of the engine. The distribution can be absolutely regular, with connections 45 at angles of 120°, or less regular, where lateral connections 45 form angles A of 90° to 120° with upper connection 45. In addition, connections 43 between first flange 40 of mounting element 39 and attaching flange 29 are designed to transmit forces in direction X and in direction T', which is roughly tangential to the flanges, and directed precisely in the main direction of wing 25a or 25b or of central panel 26, in front of which connections 43 extend respectively. A final flexible connection 46 will be noted, directly connecting the lower face of central panel 26 and engine 22, forward of structure 20, i.e. the other side of attaching flange 29 from other connections 43 and 45.

In a particular embodiment connections 43 and more specifically 45 can be flexible. This embodiment enables the engine's vibrations to be filtered out from the remainder of the aircraft.

The effects of this design can be explained as follows. If engine 22 is attached in a plane passing through the centre of gravity it is then possible to uncouple the eigenmodes of vibration which are transmitted to the remainder of the aircraft, and easier to take act upon them to reduce them, using known measures, and notably by judiciously choosing flexible connections 45 and their positions. Uncoupling, resulting from the isostatic assembly, and the flexibility resulting from the flexible connections, therefore enable the vibrations to be filtered, and the choice of connections transmitting only axial forces X and tangential forces T prevents bending stresses from being transmitted in mounting element 39. Flexible connections 43 adjacent to attaching flange 39 have comparable properties and effects of preventing bending wings 25a, 25b and central panel 26, and of enabling the vibrations to be filtered. Transmission of the forces of engine 22 to structure 20 is gradual, without excessive irregularity of the stresses in connecting portion 24c and mounting element 39, if connections 43 and 45 are quite well aligned in pairs in direction X, i.e. if there are equal numbers of connections 43 and 45, with close angular spaces. The forces resulting from the overhang are sustained principally by mounting element 39, which is very rigid, then by wings 25a and 25b which, whilst being less rigid, also resist them satisfactorily due to their flatness, to the absence of forces perpendicular to their plane and to their support by main portion 23 over their entire width (in axial direction X). Additional flexible connection 46 enables a proportion of forces Y and Z due to the overhang to be transmitted, in directions Y and Z. It can also be used to filter out certain modes of vibration, without introducing a deflection harmful to engine 22.

Despite all the advantages of the separate connections these can be eliminated, and flanges 39, 40, 41 and 44 can be fishplated using bolts, which may imply that the assembly is lighter.

Another advantage of wings 25a and 25b is that they can easily be fitted with an oblique edge 47, such that they become shorter towards the front, i.e. that they cover engine 22 less, and therefore allow easier access than the habitual quarter-circle structures, which it would be more difficult to manufacture with such an edge.

FIG. 12 is now considered for another embodiment of a connecting portion 24d. Wings 25a, 25b are replaced by wings 48a and 48b, which are also flat, and which have approximately the same extension, but which do not consist in this case of panels or plates, but of sets of three connecting rods connected to one another in a triangle, where a first of connecting rods 49a extends along the end face of main portion 23, where a second, 49b, along the length of attaching flange 29, and the third, 49c, between the previous ones, in the position of oblique edge 47 of the other embodiment. It is possible for central panel 26 to be absent. The invention is applicable to different types of engine, notably propfans and turbofans. The structure can be mounted on the fuselage or on a wing surface of aircraft 21.

The invention claimed is:

1. An aircraft engine mounting structure, comprising:
a linear main portion and a connecting portion attached to the main portion,
wherein the connecting portion includes two flat wings extending laterally to the main portion at an angle to one another, and an attaching flange configured to transmit all the motive forces,
wherein the attaching flange extends at least over a sector of a circle and is attached to the wings by a flat face.

2. A structure according to claim 1, wherein a width of the wings is equal to a width of the main portion in the aircraft's axial direction.

3. A structure according to claim 1, wherein the wings comprise panels.

4. A structure according to claim 3, wherein the connecting portion includes a central panel combined with an end face of the main portion and forming a single part with the wings.

5. A structure according to claim 4, wherein the central panel and the wings are combined by ribs.

6. A structure according to claim 1, wherein the wings comprise connecting rods joined to one another.

7. A structure according to claim 6, comprising three interconnected connecting rods, in a shape of a triangle, for each of the wings.

8. A structure according to claim 1, wherein the attaching flange includes a main portion that extends over a sector of the circle and an additional sector attached to the main portion so as to close the circle, and manufactured with a less resistant section than the main portion.

9. A structure according to claim 1, wherein the wings are shorter the further they are from the attaching flange.

10. An aircraft assembly comprising:
a mounting structure and an engine according to claim 1, wherein the engine is attached directly to the attaching flange.

11. An aircraft assembly comprising:
a mounting structure and an engine according to claim 1, wherein the engine is attached to the attaching flange by a mounting element that includes a first flange attached to the attaching flange and a second flange attached to the engine, wherein the first flange and the second flange are circular over a circumference, wherein the mounting element also includes a rigid structure attaching the first flange to the second flange, and wherein the first flange, the second flange, and the structure surround the engine.

12. An aircraft assembly according to claim 11, wherein the mounting element is attached at least to the engine by flexible connections.

13. An aircraft assembly according to claim 12, further comprising an additional flexible connection between the engine and the structure, wherein the additional flexible connection and the mounting element are located on either side of the attaching flange in an axial direction of the aircraft.

14. An aircraft, fitted with a mounting structure according to claim 1.

15. An aircraft, fitted with an engine assembly according to 10.

* * * * *